United States Patent
Chottiner (10) Patent No.: US 10,316,931 B2
(45) Date of Patent: Jun. 11, 2019

(54) PENDULUM FOR CRANKSHAFT HAVING FULL ONE-PIECE BUMPER TO IMPROVE NVH

(71) Applicant: Ford Global Technologies, LLC, Dearborn, MI (US)

(72) Inventor: Jeffrey Eliot Chottiner, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 248 days.

(21) Appl. No.: 15/257,825

(22) Filed: Sep. 6, 2016

(65) Prior Publication Data

US 2018/0066728 A1 Mar. 8, 2018

(51) Int. Cl.
| | |
|---|---|
| *F16F 15/14* | (2006.01) |
| *F16F 15/28* | (2006.01) |
| *F16F 3/06* | (2006.01) |
| *F16C 3/06* | (2006.01) |

(52) U.S. Cl.
CPC .............. *F16F 15/145* (2013.01); *F16C 3/06* (2013.01); *F16F 15/283* (2013.01); *F16C 2360/22* (2013.01)

(58) Field of Classification Search
CPC .. F16F 15/145; F16F 15/1407; F16F 15/1457; F16F 15/1414; F16F 15/1421; F16F 15/283; F16F 15/13128; F16F 15/1464; F16F 15/12; F16F 15/26; F16C 3/06
See application file for complete search history.

(56) References Cited

U.S. PATENT DOCUMENTS

| | | |
|---|---|---|
| 4,739,679 A | 4/1988 | Berger et al. |
| 9,322,454 B2 | 4/2016 | Glanfield et al. |
| (Continued) | | |

FOREIGN PATENT DOCUMENTS

| | | | | |
|---|---|---|---|---|
| DE | 102011100868 A1 | * | 11/2012 | ............ F16F 15/145 |
| DE | 102014213462 A1 | * | 1/2015 | ............ F16F 15/145 |
| (Continued) | | | | |

OTHER PUBLICATIONS

EPO Translation of Description of DE 102011100868 A1, Grahl et al., Nov. 15, 2012. (Year: 2018).*

*Primary Examiner* — Daniel D Yabut
(74) *Attorney, Agent, or Firm* — LeClairRyan (57) ABSTRACT

A full, one-piece, wrap around bumper for a crankshaft pendulum is disclosed. The pendulum includes two halves. Continuous, mirror-image bumper-receiving channels are formed in each pendulum half. When the two halves are attached, the bumper is captured between therebetween and is retained by a crush fit. Each pendulum half includes an elevated central area and a pair of recessed areas with each recessed area formed on one side of the elevated area. Side walls are formed at the intersections of the elevated area and the recessed areas. A base wall is formed along the lower edge of the elevated area. The continuous channel in each half is formed along portions of the side walls and along the entire length of the base wall. The elongated, one-piece bumper wraps around the side walls and the base wall and extends from the elevated area beyond the side and base walls.

20 Claims, 7 Drawing Sheets

(56) References Cited

U.S. PATENT DOCUMENTS

| | | | | |
|---|---|---|---|---|
| 2013/0139641 A1* | 6/2013 | Schierling | ............ | F16F 15/145 |
| | | | | 74/574.4 |
| 2015/0090073 A1* | 4/2015 | Glanfield | ............ | F16F 15/286 |
| | | | | 74/604 |
| 2016/0195159 A1* | 7/2016 | Takikawa | ............ | F16F 15/145 |
| | | | | 74/574.2 |
| 2017/0146091 A1* | 5/2017 | Chottiner | ............ | F16F 15/283 |

FOREIGN PATENT DOCUMENTS

| | | | | |
|---|---|---|---|---|
| FR | 2986593 A1 * | 8/2013 | ............ | F16F 15/145 |
| KR | 101417531 | 7/2014 | | |

\* cited by examiner

PENDULUM FOR CRANKSHAFT HAVING FULL ONE-PIECE BUMPER TO IMPROVE NVH

TECHNICAL FIELD

The disclosed inventive concept relates generally to pendulum crankshafts for internal combustion engines. More particularly, the disclosed inventive concept relates to a one-piece bumper arrangement that prevents metal-to-metal impact of the pendulum assembly on the pendulum carrier by providing a single that cannot slip from its position as assembled between two pendulum halves.

BACKGROUND OF THE INVENTION

Internal combustion engines having a relatively small number of cylinders provide automobile makers with an attractive solution to the need for improved fuel economy. In order to compensate for reduction of cubic capacity vehicle manufacturers developed technologies to improve engine power, such as direct fuel injection, turbocharging, and variable timing for inlet and exhaust camshafts. In this way six- and eight-cylinder engines can be scaled down without losing available horsepower.

An undesirable consequence of engines with a small number of cylinders is high crankshaft torsional vibration and high engine block vibration caused by forces, such as first and second engine order forces, that are not cancelled. Such torsional vibrations are ultimately transmitted through the engine mounts and to the vehicle structure.

Engineers managed these vibrations to one extent or another through a variety of approaches, many of which increase the cost of construction and reduce fuel economy. One accepted solution to overcome excessive vibration is the provision of one or more pendulums on the crankshaft to lower the torsional vibration of the crankshaft and the consequent vehicle noise and harshness. Such crankshaft-mounted pendulums function as vibration absorbers as they are tuned to address and thus reduce vibrations generated by oscillating torque, thus smoothing torque output of the crankshafts. This approach is taken as well by designers of some airplane piston engines where the pendulums smooth output torque and reduce stress within the crankshaft itself.

An example of a pendulum vibration absorber associated with an engine crankshaft is set forth in U.S. Pat. No. 4,739,679, assigned to the assignee of the instant application. According to the arrangement set forth in this patent, a pendulum includes an inner curved cam follower surface that is alternately engaged and disengaged from a pin type cam fixed on the pendulum carrier.

The crankshaft pendulum is interconnected with the pendulum carrier by pairs of rollers that are movable on mating curved tracks. While there are a number of variations of the movable relationship between the pendulum and the crankshaft, it is common to incorporate rolling pins as the points of contact between these two components.

Each rolling pin requires a pendulum rolling pin track in which the rollers can roll. Known rolling pin tracks have a great distance between the walls of the track and the rolling pin. When the engine is running and the crankshaft is rotating, centrifugal force keeps the pendulum in its full out position. The pendulum responds to the oscillating torque by moving side to side. This reduces the oscillating torque to the transmission to improve NVH. The pendulum can hit the bumpers if the oscillating torque is too high. In this case, the pendulums would need to be detuned. The other time the pendulums hit is during start up and shut down when there is not enough centrifugal force to overcome gravity. The bumpers are intended to reduce the NVH of metal hitting metal in these three cases. In this position, the centrifugal force is sufficient to overcome gravity and the torsionals are so low as not to cause the pendulum to move back and forth. However, when the engine is turned off and rotational movement of the crankshaft stops, centrifugal motion stops as well and the pendulum, no longer held in its full out position, may move to its full travel condition in which the pendulum experiences a drop caused by gravity if the stopped position of the pendulum is "up" or is generally above the midline of the crankshaft. If the pendulum is stopped in this position, then it will drop before hitting metal-on-metal, thus increasing undesirable NVH in the engine and, consequently, in the vehicle.

To compensate for this drop, rubber bumpers are located on the pendulum or on the pendulum carrier to dampen the metal-on-metal contact. When the pendulums are over-excited or during engine start-up or shut-down, the bumpers hit their stops. In known designs, the bumpers can move out of their assembled positions, thereby compromising original NVH benefits and possibly adding to the NVH problem. Out-of-position bumpers may also become loose entirely and create a a risk of clogged oil lines, leading to early engine failure.

Thus a new approach to the pendulum bumpers is needed to address the problems associated with known arrangements.

SUMMARY OF THE INVENTION

The disclosed inventive concept overcomes the challenges faced by known pendulum arrangements for internal combustion engines by providing a one-piece bumper that cannot inadvertently become loose from the pendulum. Regardless of engine operation, the bumper stays attached to the pendulum.

The pendulum assembly for attachment to the crankshaft of an internal combustion engine of the disclosed inventive concept comprises a pendulum having a single, one-piece, full-length, wrap-around bumper. The one-piece bumper is a narrow elongated strip that preferably defines a trapezoid in cross-section. As an alternative the cross-section of the one-piece bumper can be a parallelogram in the from of square or a rectangle having flat inner and outer surfaces and flat walls.

The pendulum is comprised of two halves. Continuous, mirror-image bumper-receiving channels are formed in each pendulum half. The bumper is fitted into channels of the same shape formed in the pendulum halves. When the two halves are fitted together, the bumper is captured between the two pendulum halves and is securely retained therebetween by a crush fit.

Each pendulum half includes an elevated central area and a pair of recessed areas with each recessed area formed on one side of the elevated area. Side walls are formed at the intersections of the elevated area and the recessed areas. A base wall is formed along the lower edge of the elevated area. The continuous channel in each half is formed along portions of the side walls and along the entire length of the base wall. The elongated, one-piece bumper wraps around most of the side walls and all of the base wall and extends from the elevated area beyond the side walls and base wall.

The bumper is composed of a polymerized material including, but not limited to, natural rubber, synthetic rubber, or any other flexible and resilient material that is able to withstand oil.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

In the following figures, the same reference numerals will be used to refer to the same components. In the following description, various operating parameters and components are described for different constructed embodiments. These specific parameters and components are included as examples and are not meant to be limiting.

Figure 1:
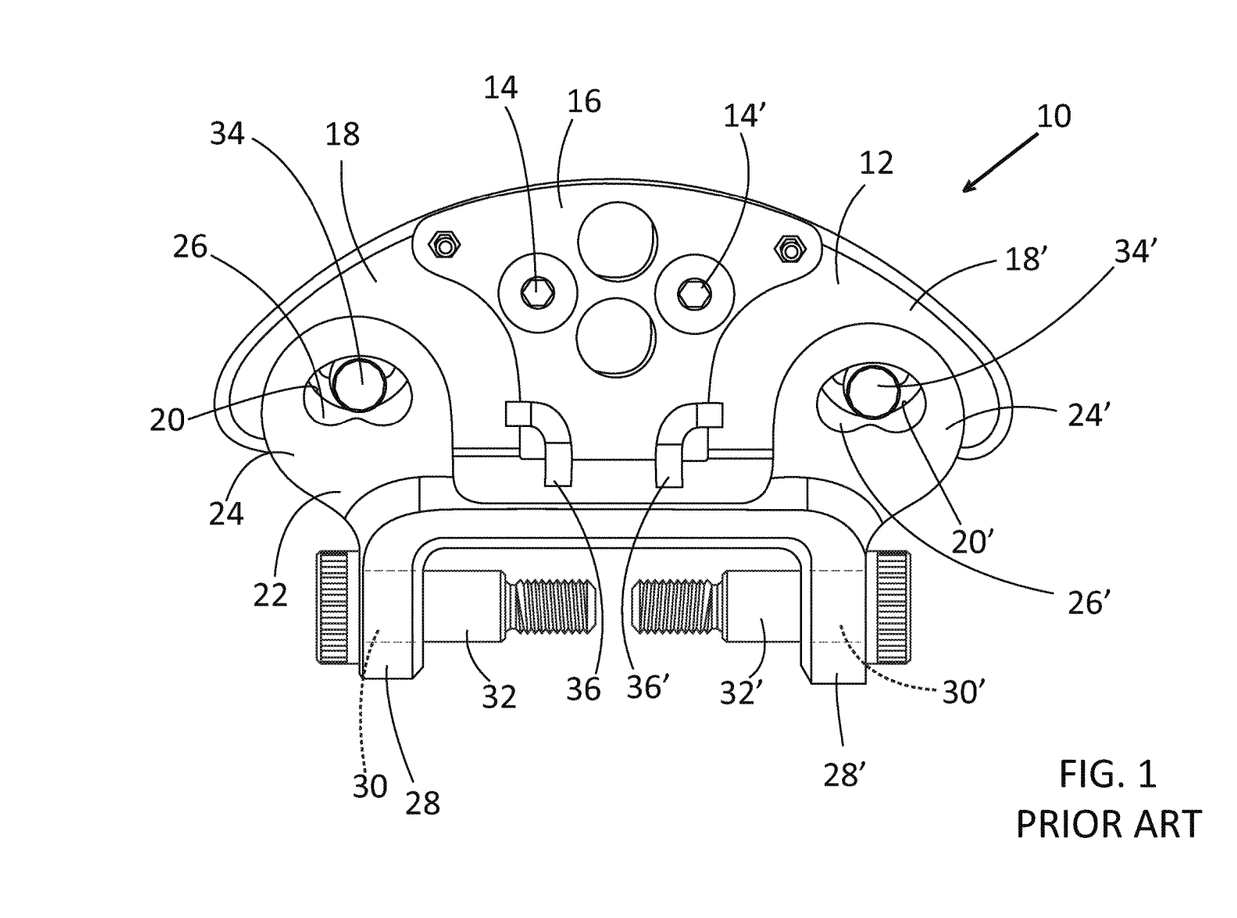
FIG. 1 is a side view of a portion of a pendulum assembly for attachment to a crankshaft according to the prior art.

Referring to FIG. 1, a view of a known pendulum assembly is illustrated. Referring to FIGS. 2 through 7, the pendulum assembly according to the disclosed inventive concept is illustrated from various views, both with and without the one-piece bumper installed.

FIG. 1 is a side view of a pendulum assembly for attachment to a crankshaft as is known in the art. The pendulum assembly, generally illustrated as 10, is shown in a side view. The pendulum assembly 10 includes two pendulum halves in which one, a first pendulum half 12, is viewable. The pendulum halves are typically attached to one another by mechanical fasteners, such as a first bolt 14 and a second bolt 14'.

The first pendulum half 12 includes an elevated area 16 and a pair of spaced-apart recessed areas 18 and 18'. A kidney-shaped rolling pathway 20 is formed in the recessed area 18. A kidney-shaped rolling pathway 20' is formed in the recessed area 18'. The pendulum assembly 10 is attached to a crankshaft (not shown) by a pendulum carrier 22. The pendulum carrier 22 includes a first carrier ear 24 and a second carrier ear 24'. A kidney-shaped rolling pathway 26 is formed in the first carrier ear 24 and a kidney-shaped rolling pathway 26' is formed in the second carrier ear 24'.

The pendulum carrier 22 further includes a pair of crankshaft attachment arms 28 and 28'. The crankshaft attachment arm 28 has a bolt hole 30 formed therethrough. The crankshaft attachment arm 28' has a bolt hole 30' formed therethrough. Mechanical fasteners such as shoulder bolts 32 and 32' attach the pendulum carrier 22 to the crankshaft.

Fitted between each pendulum half are rolling pins 34 and 34'. The rolling pin 34 is fitted through the kidney-shaped rolling pathway 26 of the first carrier ear 24 of the pendulum carrier 22 and into the kidney-shaped rolling pathway 26 of the first pendulum half 12 and into the kidney-shaped rolling pathway of the second pendulum half. The rolling pin 34' is fitted through the kidney-shaped rolling pathway 26' of the second carrier ear 24' of the pendulum carrier 22 and into the kidney-shaped rolling pathway 26' of the first pendulum half 12 and into the kidney-shaped rolling pathway of the second pendulum half.

A first angled bumper 36 and a second angled bumper 36' are provided to provide impact dampening. The angled bumpers 36 and 36' are L-shaped and extend from the pendulum halves.

While providing one advantageous solution to the challenges faced in efforts to reduce NVH in crankshaft pendulums, the known solution shown in FIG. 1 and discussed in relation thereto faces certain challenges. One of the challenges is that the portion of the L-shaped bumpers 36 and 36' provide only a small contact area. Another challenge is that the L-shaped bumpers 36 and 36' are difficult to set in length. If the bumpers 36 and 36' are too long, the pendulums will be prevented from fully oscillating, thus reducing their performance. If the bumpers 36 and 36' are too short, the likelihood of metal-on-metal contact is increased, thus adding to NVH. An additional challenge of the design illustrated in FIG. 1 is that, once installed in one half of the pendulum, the bumpers 36 and 36' may pop out before the other half of the pendulum can be attached.

Figure 2:
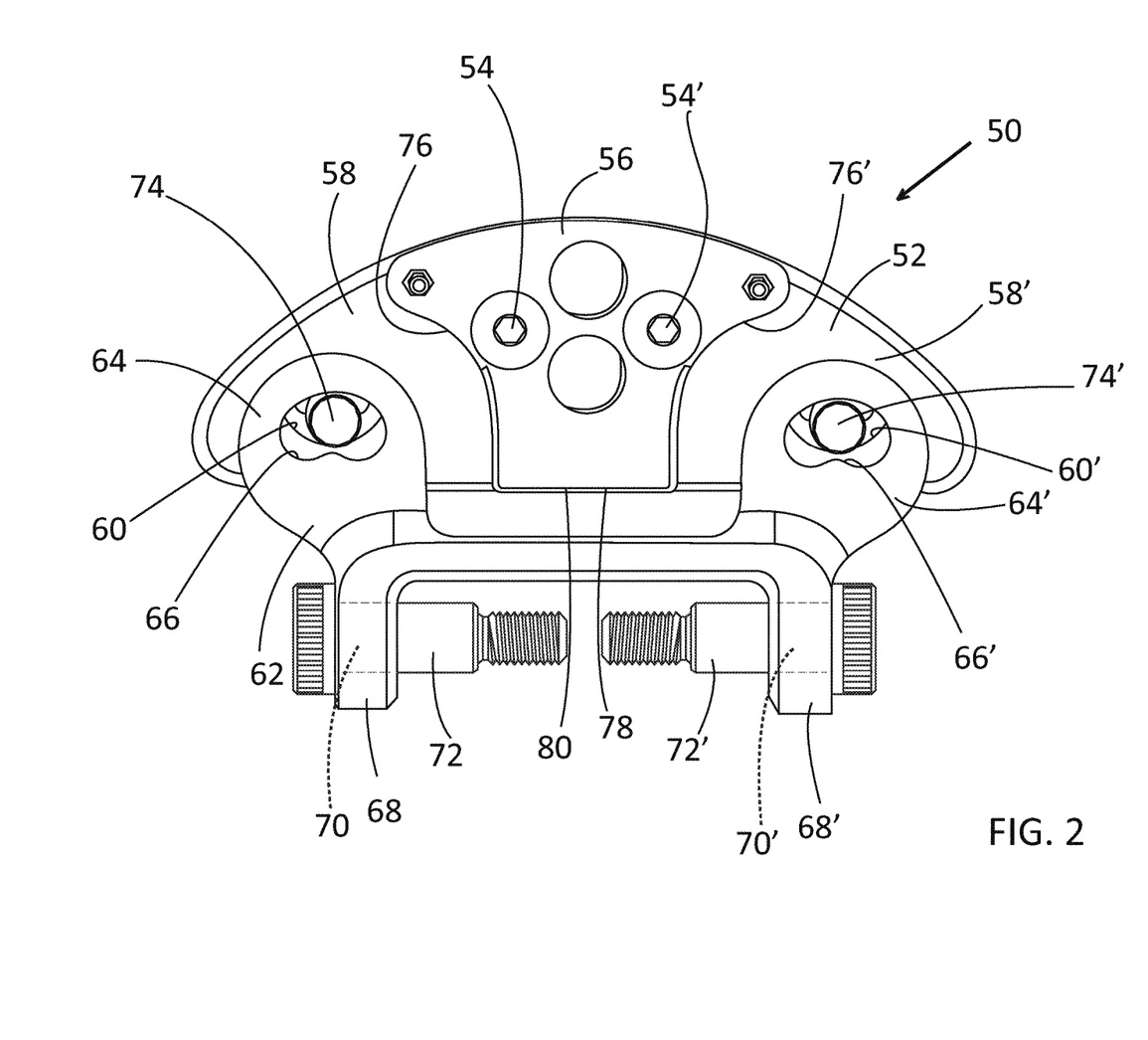
FIG. 2 is a side view of a portion of a pendulum assembly for attachment to a crankshaft according to the disclosed inventive concept showing the continuous channel formed to receive a one-piece bumper.

The disclosed inventive concept overcomes the challenges faced by known solutions to reducing NVH in crankshaft pendulums. FIG. 2 is a side view of a pendulum assembly for attachment to a crankshaft according to the disclosed inventive concept. The pendulum assembly, generally illustrated as 50, is shown in side view. The pendulum assembly 50 includes two pendulum halves in which one, a first pendulum half 52, is viewable. The pendulum halves are attached to one another by mechanical fasteners, such as a first bolt 54 and a second bolt 54'.

The first pendulum half 52 includes an elevated area 56 and a pair of spaced-apart recessed areas 58 and 58'. A kidney-shaped rolling pathway 60 is formed in the recessed area 58. A kidney-shaped rolling pathway 60' is formed in the recessed area 58'. The pendulum assembly 50 is attached to a crankshaft (not shown) by a pendulum carrier 62. The pendulum carrier 62 includes a first carrier ear 64 and a second carrier ear 64'. A kidney-shaped rolling pathway 66 is formed in the first carrier ear 64 and a kidney-shaped rolling pathway 66' is formed in the second carrier ear 64'.

The pendulum carrier 62 further includes a pair of crankshaft attachment arms 68 and 68'. The crankshaft attachment arm 68 has a bolt hole 70 formed therethrough. The crankshaft attachment arm 68' has a bolt hole 70' formed therethrough. Mechanical fasteners such as shoulder bolts 72 and 72' attach the pendulum carrier 62 to the crankshaft.

Fitted between each pendulum half are rolling pins 74 and 74'. The rolling pin 74 is fitted through the kidney-shaped rolling pathway 66 of the first carrier ear 64 of the pendulum carrier 62 and into the kidney-shaped rolling pathway 66 of the first pendulum half 52 and into the kidney-shaped rolling pathway of the second pendulum half. The rolling pin 74' is fitted through the kidney-shaped rolling pathway 66' of the second carrier ear 64' of the pendulum carrier 62 and into the kidney-shaped rolling pathway 66' of the first pendulum half 52 and into the kidney-shaped rolling pathway of the second pendulum half.

Figure 4:
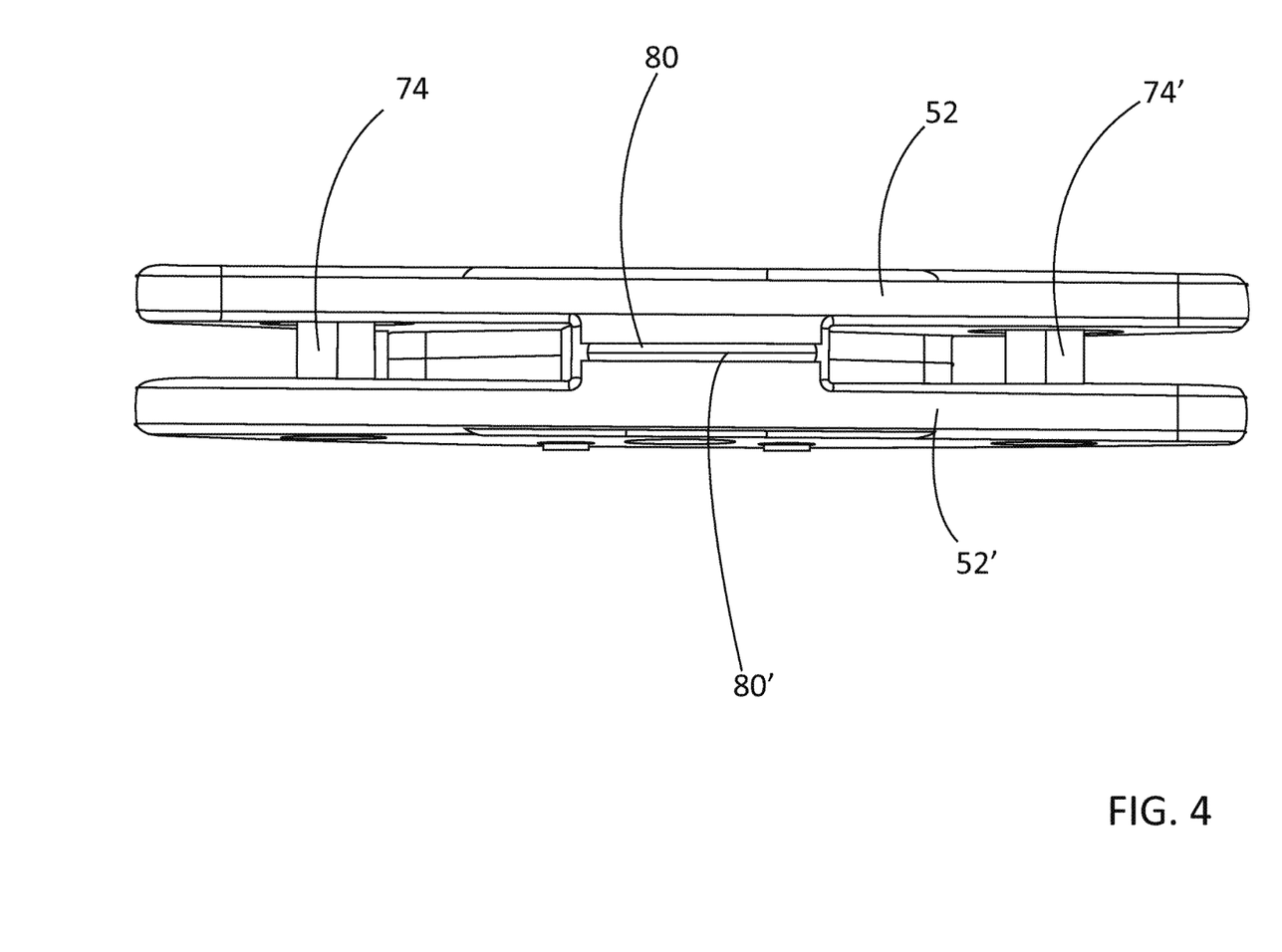
FIG. 4 is a bottom view of the two pendulum halves of the pendulum assembled together illustrating the bumper-receiving continuous channel formed therebetween.

To avoid possible undesirable metal-to-metal contact when the pendulum is in its full travel condition, an impact-dampening element is provided. Particularly, the elevated area 56 of the first pendulum half 52 includes a pair of side walls 76 and 76' and a base wall 78. A continuous bumper half channel 80 is formed in portions of the side walls 76 and 76' and in the base wall 78. A similar half channel is formed on the other pendulum half as illustrated in FIG. 4 and as discussed in relation thereto. The single continuous bumper 82 may be made of any durable and oil-resistant polymerized material, such as, but not limited, to rubber.

Figure 3:
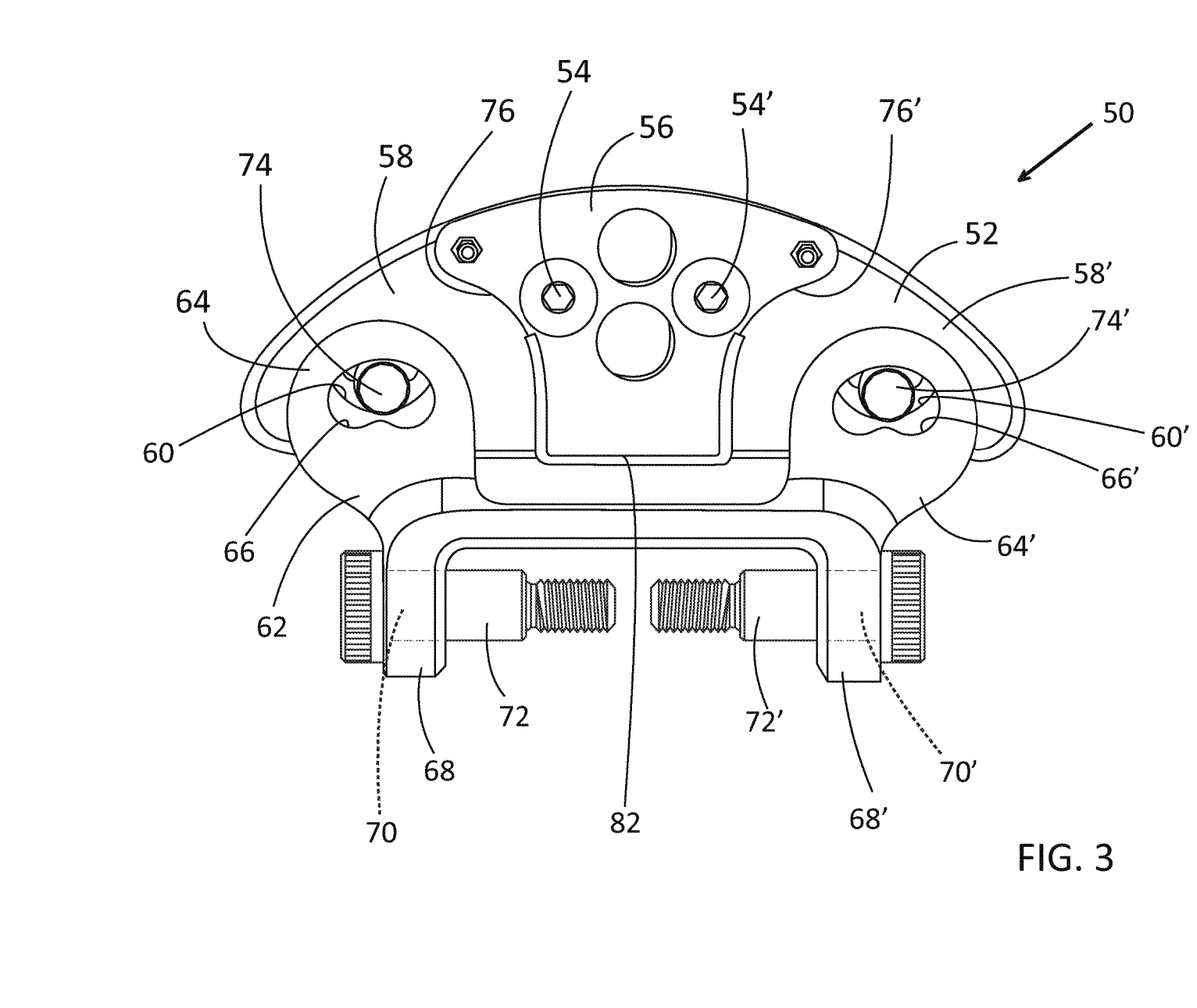
FIG. 3 is a view similar to that of FIG. 2 but illustrating the one-piece bumper in position in the continuous bumper channel formed in one pendulum half.

As shown in FIG. 3, a single continuous bumper 82 is fitted in the continuous bumper half channel 80 formed in portions of the side walls 76 and 76' and in the base wall 78. The single continuous bumper 82 thus forms a U-shape in its position wrapped around the side walls 76 and 76' and the base wall 78. As shown in FIG. 3, the thickness of the single, continuous bumper 82 is greater than the depth of the continuous bumper half channel 80, and thus extends therefrom.

A bottom view of the pendulum 50 is illustrated inn FIG. 4. The pendulum 50 comprises the pendulum half 52 and a mirror image pendulum half 52'. The pendulum half 52 includes the continuous bumper half channel 80 and the pendulum half 52' having a continuous bumper half channel 80'. As illustrated in FIG. 4, a single, continuous and elongated channel is formed by the two half channels 80 and 80'.

Figure 5:
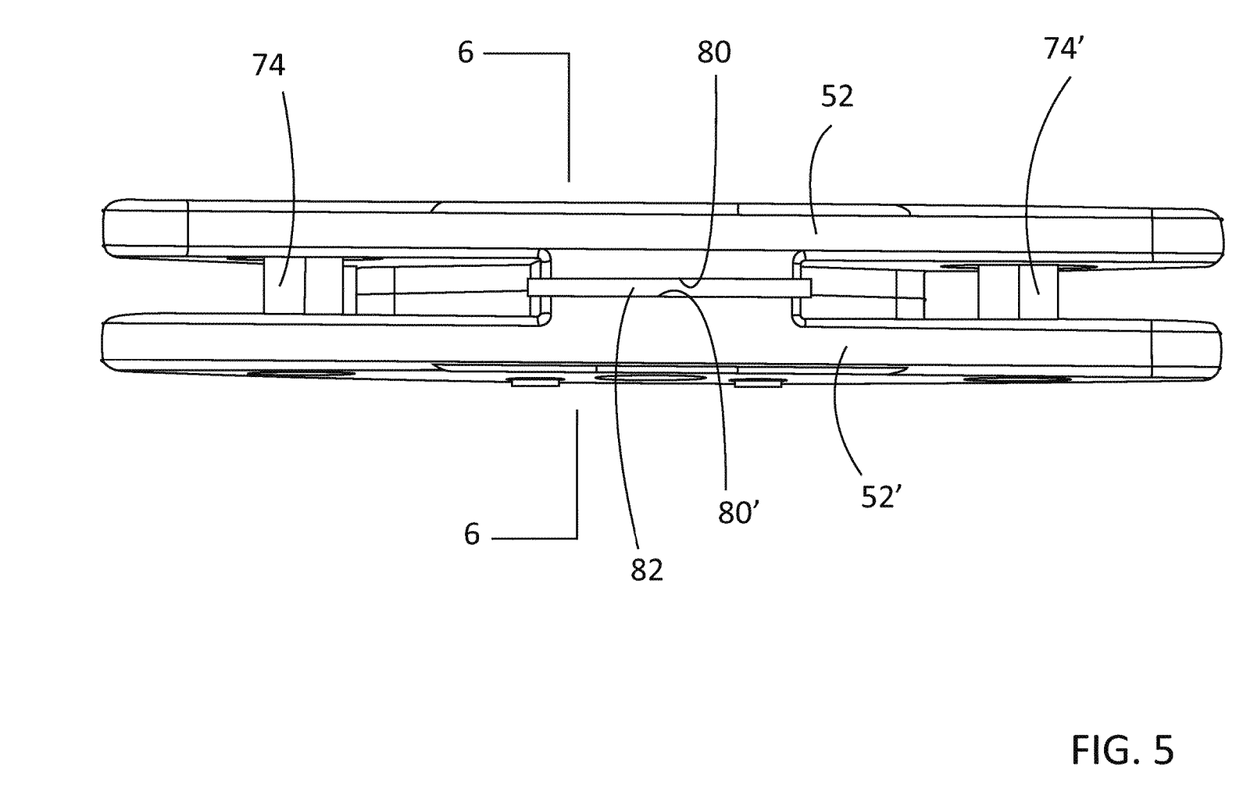
FIG. 5 is the same view as FIG. 4 but illustrating a one-piece bumper captured between the two pendulum halves.

A bottom view of the pendulum 50 having the one-piece bumper 82 is illustrated inn FIG. 5. As illustrated, the one-piece bumper 82 is crush-fitted between the pendulum half 52 and the pendulum half 52'.

Figure 6:
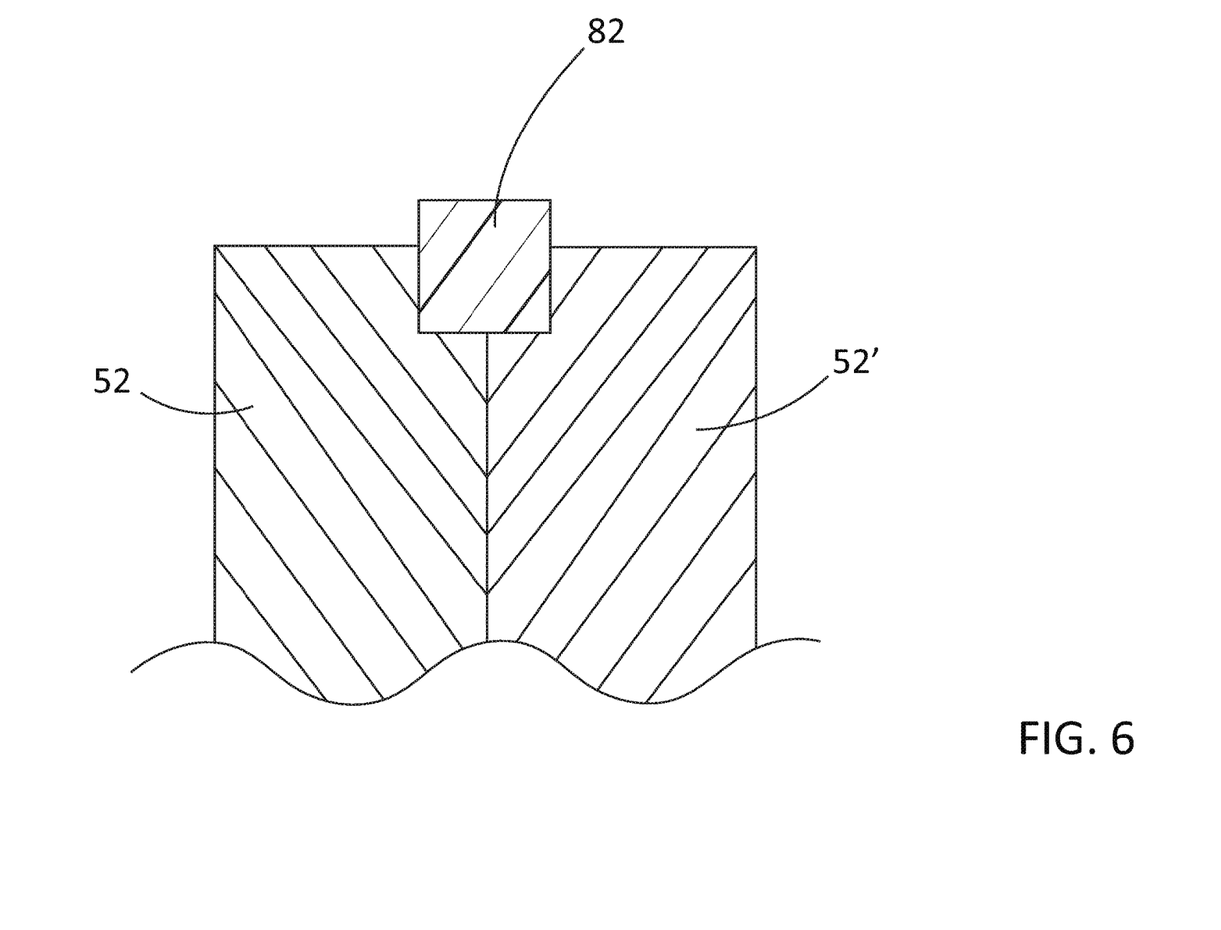
FIG. 6 is a sectional view taken along line 6-6 of FIG. 5 illustrating a possible shape of the one-piece bumper.

While the shape of the elongated, one-piece bumper 82 may be selected from a variety of shapes, the shape may be a parallelogram in cross-section, that is, having a square or a rectangular shape, or, more preferably, may be a trapezoid in cross-section. The parallelogram shape is illustrated in FIG. 6 taken along line 6-6 of FIG. 5 in which a square shape of the one-piece bumper 82 is illustrated. As shown, the one-piece bumper has a flat top, a flat bottom and opposed flat sides.

Figure 7:
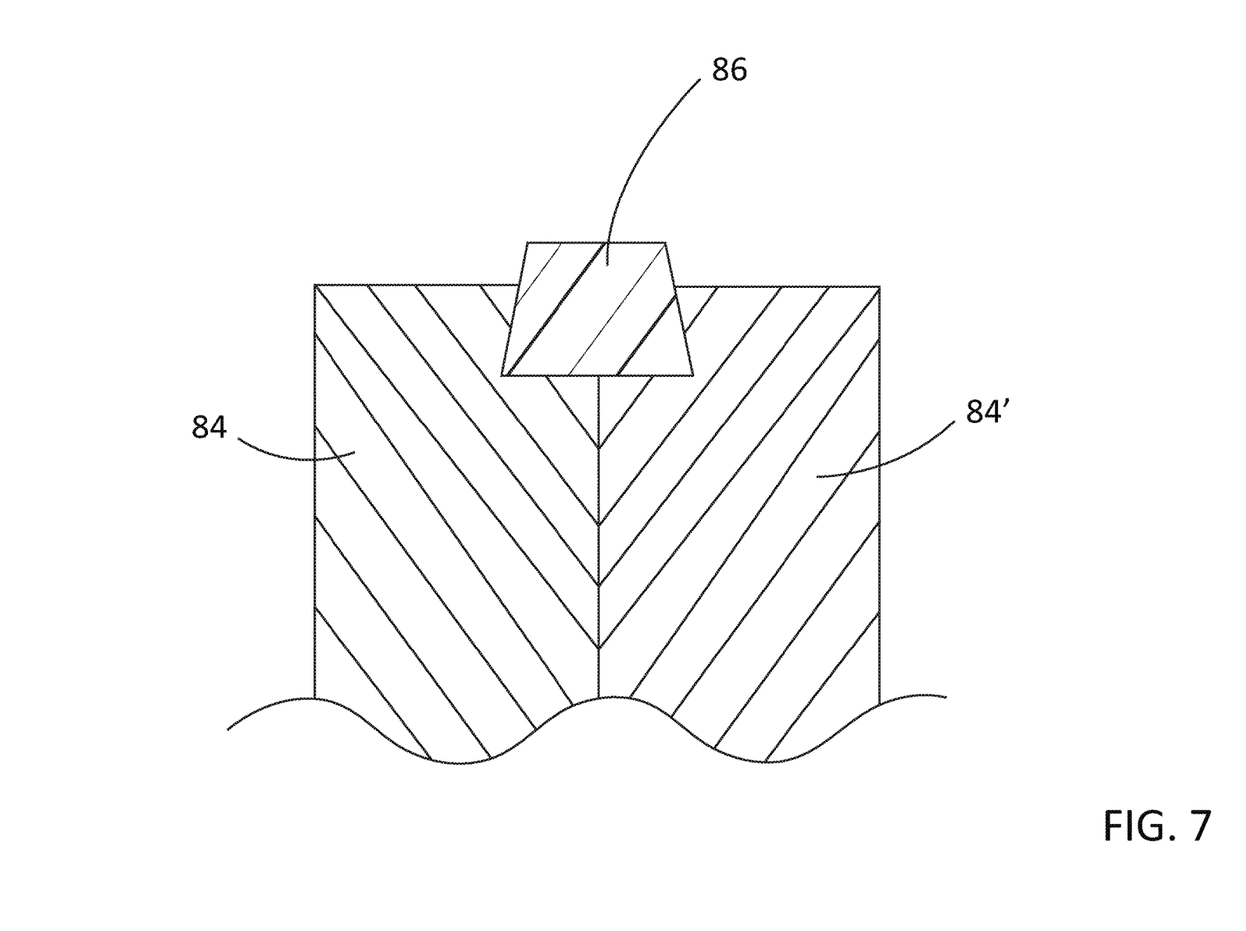
FIG. 7 is a sectional view of a one-piece bumper according to the preferred alternate design in which the bumper has a trapezoidal shape.

Other shapes may be selected without deviating from the spirit or scope of the disclosed inventive concept. An alternative and preferred shape is illustrated in FIG. 7 in which a pendulum half 84 and a pendulum half 84' are shown in sectional view with an elongated, one-piece bumper 86 having a trapezoidal shape captured by crushing therebetween. The trapezoidal shape of the one-piece bumper 86 reduces the possibility of the bumper 86 from becoming free from the pendulum halves 84 and 84' during engine operation.

It is to be understood that the pendulum carrier 50 is one of several possible design configurations intended to connect the pendulum assembly 40 to the crankshaft. Thus the configuration of the pendulum carrier 50 as illustrated in is not intended to be limiting but is only intended as being suggestive.

The disclosed inventive concept as set forth above overcomes the challenges faced by known pendulum crankshaft arrangements for internal combustion engines by providing a one-piece, durable, full length, wrap-around bumper for capture in a continuous, elongated channel formed between two halves of the pendulum. The amount of bumper protrusion can be easily set according to the disclosed inventive concept provides as the one-piece bumper fits into a single channel. The amount of bumper protrusion is established by both the size of the channel and the thickness of the bumper. In addition, the pendulum assembly of the disclosed inventive concept is easily assembled as the bumper is positioned in the half-channel of one of the pendulum halves followed by positioning of the other pendulum half thereover. Fastening of the one half to the other half creates a crush fit, thereby securing the bumper in the channel.

One skilled in the art will readily recognize from such discussion, and from the accompanying drawings and claims that various changes, modifications and variations can be made therein without departing from the true spirit and fair scope of the invention as defined by the following claims.

What is claimed is:

1. A pendulum crankshaft assembly for attachment to a crankshaft of an engine comprising:
   a pendulum carrier attached to the crankshaft, said pendulum carrier having an upper surface;
   a pendulum attached to said pendulum carrier, said pendulum comprising a first half including a raised area and recessed areas directly adjacent to and extending from said raised area, said raised area defined by inner side and base walls, said base wall opposing said upper surface, an elongated channel formed in said base wall and in at least part of said side walls, said elongated channel being axially spaced-apart from said recessed areas; and
   a one-piece bumper in said elongated channel.

2. The pendulum crankshaft assembly of claim 1 wherein said pendulum further comprises a second half having a raised area defined by inner side and base walls, whereby half of said elongated channel is formed in said raised areas of each half.

3. The pendulum crankshaft assembly of claim 2 in which each half includes recessed areas adjacent said raised area, said elongated channel being axially spaced-apart from said recessed areas of each half.

4. The pendulum crankshaft assembly of claim 2 wherein said one-piece bumper is wider than said width of said elongated channel, whereby said one-piece bumper is crush fit between said halves when said halves are assembled.

5. The pendulum crankshaft assembly of claim 1 wherein said one-piece bumper is u-shaped.

6. The pendulum crankshaft assembly of claim 1 wherein said one-piece bumper has a shape in cross-section, said shape being selected from the group consisting of a trapezoid and a parallelogram.

7. The pendulum crankshaft assembly of claim 1 wherein said elongated channel has a depth and wherein said one-piece bumper has a thickness, said thickness of said one-piece bumper being greater than said depth of said elongated channel.

8. A pendulum crankshaft assembly for attachment to a crankshaft of an engine comprising:
   a pendulum carrier attached to the crankshaft, said pendulum carrier having an upper surface;
   a pendulum attached to said pendulum carrier, said pendulum comprising two halves, at least one half having a raised area and recessed areas directly adjacent to and extending from said raised area, said raised area having a continuous channel formed therein and axially spaced-apart from said recessed areas;

a one-piece bumper in said continuous channel.

9. The pendulum crankshaft assembly of claim 8 in which each half includes a raised area and recessed areas being directly adjacent to and extending from said raised area.

10. The pendulum crankshaft assembly of claim 8 wherein said one-piece bumper is u-shaped.

11. The pendulum crankshaft assembly of claim 8 wherein a single elongated channel is formed by said two pendulum halves when said halves are connected to one another, wherein said one-piece bumper is wider than said width of said single elongated channel, whereby said one-piece bumper is crush fit between said halves when said halves are assembled.

12. The pendulum crankshaft assembly of claim 11 wherein said single elongated channel has a depth and wherein said one-piece bumper has a thickness, said thickness of said one-piece bumper being greater than said depth of said single elongated channel.

13. The pendulum crankshaft assembly of claim 8 wherein said one-piece bumper has a shape in cross-section, said shape being selected from the group consisting of a trapezoid and a parallelogram.

14. A pendulum crankshaft assembly for attachment to a crankshaft of an engine comprising:
a pendulum carrier attached to the crankshaft, said pendulum carrier having an upper surface;
a pendulum attached to said pendulum carrier, said pendulum comprising a first half including a raised area and recessed areas directly adjacent to and extending from said raised area, said raised area defined by having inner side and base walls, said base wall opposing said upper surface, said raised area including a u-shaped channel defining a step formed in said base wall and in at least part of said side walls; and
a u-shaped, one-piece bumper positioned on said step and within said u-shaped channel, said u-shaped, one-piece bumper being spaced-apart from said recessed areas.

15. The pendulum crankshaft assembly of claim 14 wherein said pendulum comprises a second half having a raised area defined by inner side and base walls, whereby half of said u-shaped channel is formed in said raised areas of each half.

16. The pendulum crankshaft assembly of claim 15 in which each half includes recessed areas extending from and directly adjacent said raised area, said elongated channel being axially spaced-apart from said recessed areas of each half.

17. The pendulum crankshaft assembly of claim 14 wherein said u-shaped channel has a width and wherein said u-shaped, one-piece bumper is wider than said width of said u-shaped channel, whereby said u-shaped, one-piece bumper is crush fit between said halves when said halves are assembled.

18. The pendulum crankshaft assembly of claim 14 wherein said u-shaped, one-piece bumper has a shape in cross-section, said shape being selected from the group consisting of a trapezoid and a parallelogram.

19. The pendulum crankshaft assembly of claim 14 wherein said u-shaped channel has a depth and wherein said u-shaped, one-piece bumper has a thickness, said thickness of said u-shaped, one-piece bumper being greater than said depth of said u-shaped channel.

20. The pendulum crankshaft assembly of claim 14 wherein said u-shaped, one-piece bumper is composed of a polymerized material.

* * * * *